(12) United States Patent
Cho et al.

(10) Patent No.: US 6,754,650 B2
(45) Date of Patent: Jun. 22, 2004

(54) SYSTEM AND METHOD FOR REGULAR EXPRESSION MATCHING USING INDEX

(75) Inventors: Junghoo Cho, Sunnyvale, CA (US); Sridhar Rajagopalan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 09/850,825

(22) Filed: May 8, 2001

(65) Prior Publication Data

US 2004/0015909 A1 Jan. 22, 2004

(51) Int. Cl.$^7$ ............................................. G06F 17/30
(52) U.S. Cl. ................... 707/2; 707/3; 707/10
(58) Field of Search .................. 707/2, 6, 10

(56) References Cited

U.S. PATENT DOCUMENTS 5,649,186 A * 7/1997 Ferguson ................. 707/10
6,355,423 B1 * 3/2002 Rothberg et al. .......... 435/6
6,493,713 B1 * 12/2002 Kanno ........................ 707/6

FOREIGN PATENT DOCUMENTS

| EP | 886226 A1 * 12/1998 | ........... G06F/17/27 |
| JP | 2002157252 A * 5/2002 | ........... G06F/17/30 |

OTHER PUBLICATIONS

Gilbert, E et al. "Multigram Codes", IEEE Transactions on Information Theory, Mar. 1982, vol. 28, No. 2, pp 346–348.*
Baeza-Yates R. A. et al. Fast Text Searching for Regular Expressions or Automation Searching on Tries, Journal of the ACM, Nov. 1996, vol. 43, No. 6, pp. 915–936.*

* cited by examiner

*Primary Examiner*—Jack Choules
(74) *Attorney, Agent, or Firm*—John L. Rogitz

(57) ABSTRACT

A system and method for executing a regular expression (regex) query against a large data repository such as the World Wide Web includes an index engine that constructs multigram indices based on regex. A run time then receives a regex query and accesses the indices to return a set of potentially matching pages, which are then efficiently and quickly searched for matches to the regex query.

35 Claims, 5 Drawing Sheets

ARCHITECTURE

ARCHITECTURE

OVERALL FLOW

INDEX

MULTIGRAM INDEX CONSTRUCTION

PREDICATE INDEX CONSTRUCTON

INDEX ACCESS PLAN

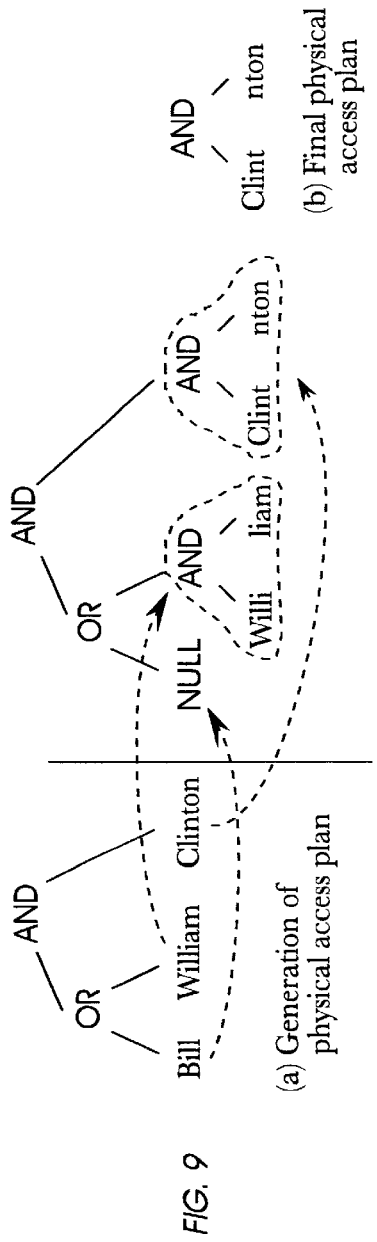
FIG. 9
(a) Generation of physical access plan
(b) Final physical access plan
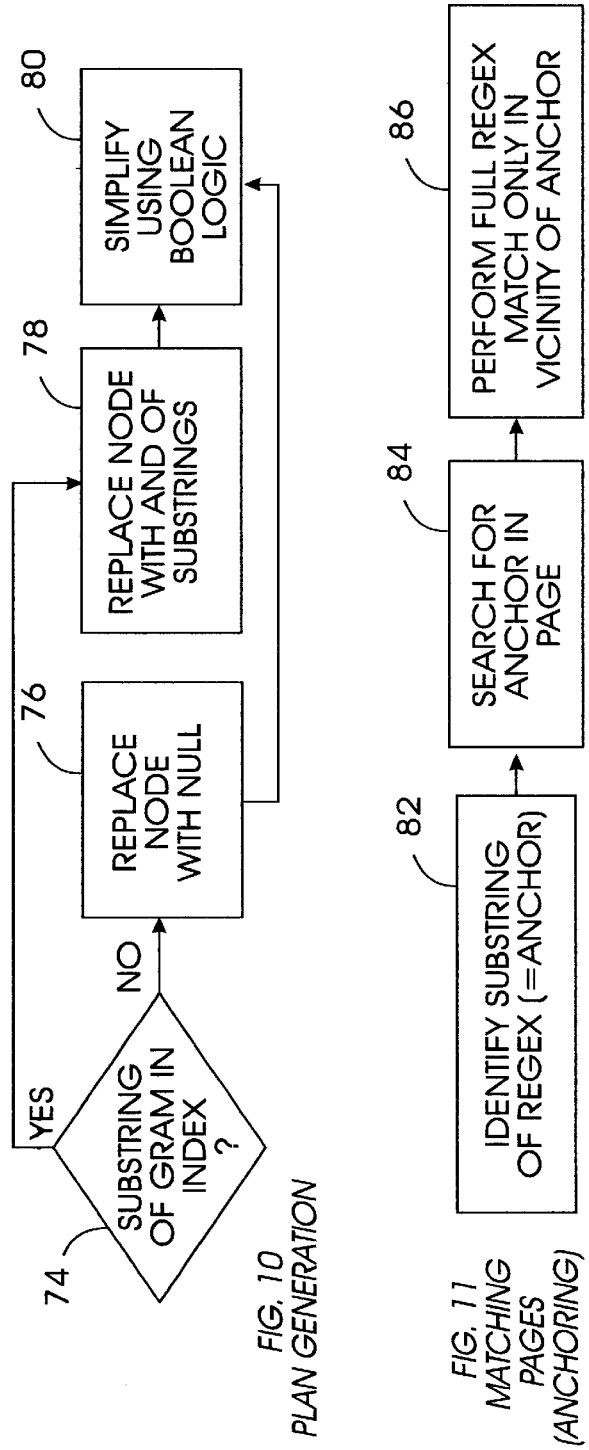
FIG. 10
PLAN GENERATION
FIG. 11
MATCHING PAGES (ANCHORING)

SYSTEM AND METHOD FOR REGULAR EXPRESSION MATCHING USING INDEX

BACKGROUND OF THE INVENTION

1. Field of the Invention

The present invention relates to matching regular expressions (regex) in data repositories such as the World Wide Web.

2. Description of the Related Art

Enormous amounts of information are available via computer networks, notably the World Wide Web. The information explosion has resulted in over a billion Web pages being available, with the number growing every day.

Perhaps the biggest challenge posed by this information deluge is how to sift through the mountain of data to find specific information. Not surprisingly, much effort has been devoted to efficiently finding sought-after information on the Web. Typically, such efforts focus on key word searching, i.e., enabling a user to type in one or more key words and subsequently returning Web pages that contain some or all of the words, in some ordered fashion.

As recognized herein, however, key word searching often requires a considerable amount of query result analysis by the user. That is, it remains the responsibility of the user to sift through the pages and extract the information being sought. To illustrate, suppose a user wants to find the middle name of Thomas Edison. Simply inputting the query "Thomas Edison" to a key word search engine will result in many hundreds or perhaps thousands of pages being returned, with the user being forced to wade through the result set until he or she happens upon the middle name.

In addition, key word search cannot match patterns which occur within words in text. Consider, for instance, a user who wants to find all references to .mp3 files stored on Stanford University computer systems. Searches of this kind are not possible using key word search methods.

As further recognized herein, examples such as the two postulated above can be more efficiently addressed using what is known in the art as "regular expressions", or "regexes". A regex is distinct from a key word search. Essentially, a regex is a string which defines a set of strings satisfying a pattern. A regex can be specified using a number of syntactic methods, including, e.g., that used by the tools flex, awk, and grep, or as set forth in the textbook *Automata Theory, Languages, and Computation*.

In the context of the above example, a user could use the following regex to efficiently find the middle name of Thomas Edison: "Thomas \a+ Edison", with "\a" meaning "any letter in the alphabet" and "+" meaning "one or more repetitions of the previous character". Thus, the expression "\a\a+" means "find strings matching the pattern Thomas [at least two letters of the alphabet] Edison", and would return only strings that have at least two letters between the words "Thomas" and "Edison". In this way, strings that have only the middle initial of Edison or no middle name at all are not returned. Only strings having at least two letters (likely to be the name "Alva") between "Thomas" and "Edison" are returned.

The present invention still further recognizes, however, that although regex matching can be used in the context of Web searching, for very large repositories like the Web, matching a regular expression using conventional regex principles can take days. Having recognized the above-noted considerations and problems, the present invention provides solutions to one or more of them as disclosed below.

SUMMARY OF THE INVENTION

To address the issues noted above, a regex query system is disclosed in which regex-based indices are first built using multigrams. When a regex query is received, the indices are used to return a set of potentially matching pages, which are then quickly and efficiently searched for matches to the regex query.

A general purpose computer is programmed according to the inventive steps herein. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Accordingly, a general purpose computer includes a regular expression (regex) index generator that generates at least one multigram index, and a run time engine that receives a regex query and that accesses the index to respond to the query. The run time engine returns data from a repository of, e.g., Web pages, in response to the query. In a preferred non-limiting embodiment, a Web crawler is associated with the data repository, and the data repository includes Web pages.

As set forth in detail below, the run time engine parses the regex query and generates an execution plan based on the parsed query. Using the execution plan, potentially matching documents in the repository are found using the index. Then, the query is executed against the matching pages.

Preferably, the index includes plural keys, with each key having an associated posting list representing documents in the repository containing the key. In a preferred implementation, the keys are multigrams. The index preferably contains only minimal useful multigrams relative to a user-defined usefulness factor "c". Further, the index can be further limited to include only suffix-free minimal useful multigrams. If desired, the index can be a predicate index including multigrams representing binary numbers.

In the presently preferred embodiment the run time engine generates an execution plan based on a parsed query by rewriting a query to have only "OR" or "STAR" logical connectives. The run time engine constructs a parse tree and replaces STAR nodes in the tree with NULL, and then removes NULL nodes. In one optimization, the run time engine executes the query by performing a fall regex match only in a predetermined vicinity of an anchor in a document.

In another aspect, a computer program device includes a computer program storage device that can be read by a digital processing apparatus. A program is on the program storage device. The program includes instructions that are executable by the digital processing apparatus for executing a regex query The program can include computer readable code means for generating at least one index, and computer readable code means for accessing the index to execute a regex query.

In still another aspect, a computer-implemented method for executing a regular expression (regex) query against a data repository includes generating at least one multigram index, and receiving a regex query. The method includes accessing the index based on the query. A set of Web pages is returned based on the accessing act. The Web pages are then searched for matches to the regex query.

The details of the present invention, both as to its structure and operation, can best be understood in reference to the accompanying drawings, in which like reference numerals refer to like parts, and in which:

BRIEF DESCRIPTION OF THE DRAWINGS

FIG. 9 is a schematic representation of a tree during and after generation of an index access plan;

FIG. 10 is a flow chart of the logic for plan generation; and

FIG. 11 is a flow chart of the anchoring logic for page matching.

DETAILED DESCRIPTION OF THE PREFERRED EMBODIMENTS

Figure 1:
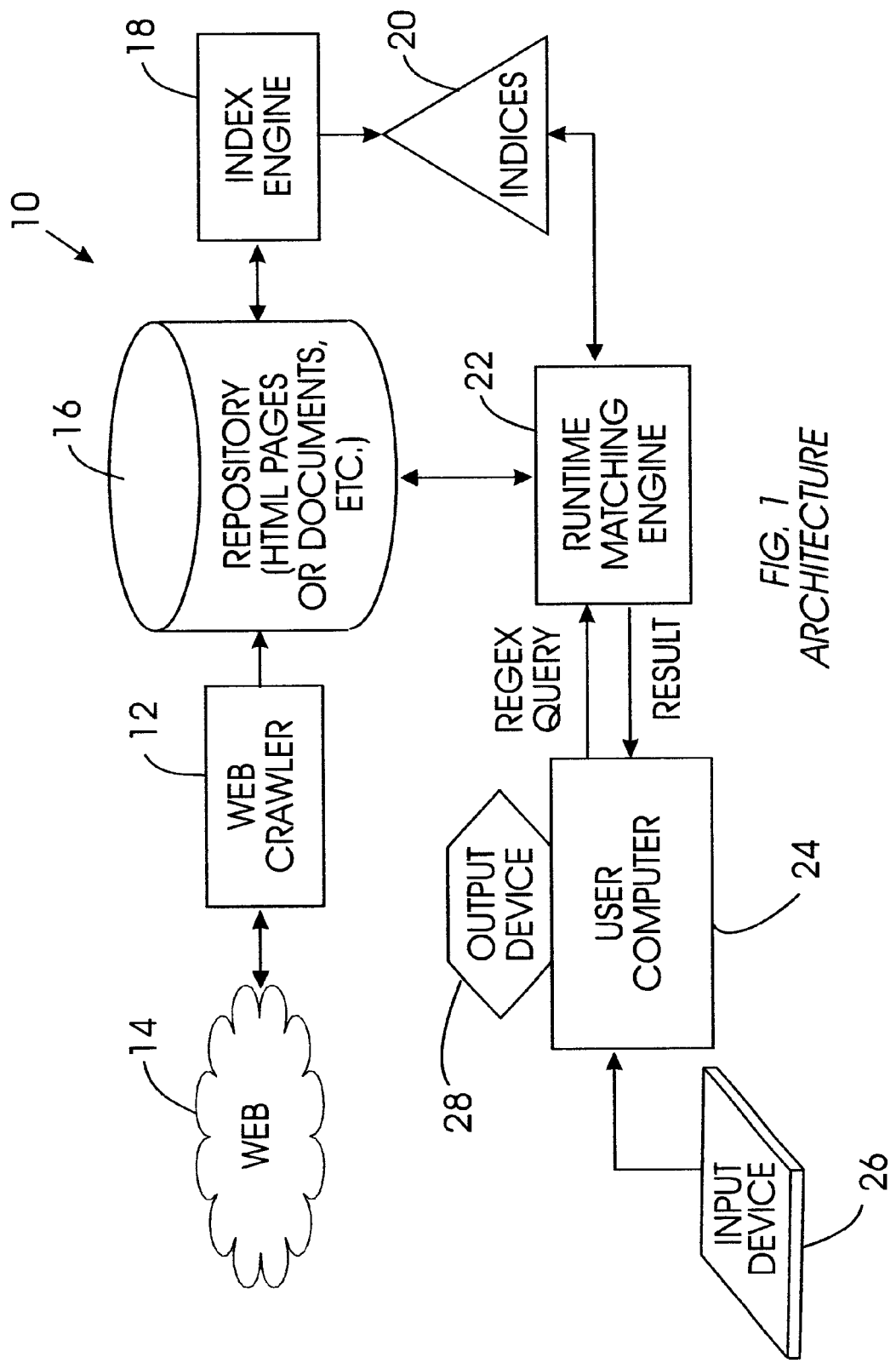
FIG. 1 is a schematic diagram showing the system of the present invention.

Referring initially to FIG. 1, a system is shown, generally designated 10, for querying a data repository such as a document database or the World Wide Web for matches to regular expressions (regex). As used herein, a "regex" is used in accordance with its definition in the art, which is distinct from a conventional key word search. A regex typically defines a set of at least two strings (as opposed to a single string defined by a key word search) that satisfy a pattern defined by the regex.

To aid in understanding the disclosure, a brief summary of symbols is as follows:

| Symbol | Meaning | Example |
|---|---|---|
| . | any character (a period is represented as \.) | a.c matches abc |
| * ("star") | zero or more repetitions of previous character | a* matches aaa |
| + | one or more repetitions of previous character | a+ equals aa* |
| ? | zero or one repetition of previous character | a? matches a or NULL |
| \| | "or" connective | a \| b matches a or b |
| [] | any character in bracket | [abc] equals a\b\c |
| \a | any alphabetic character | \a = [abc . . . z] |
| \d | any numeric character | \d = [012 . . . 9] |
| [^abc] | any character other than characters in bracket | [^abc] matches e but not a |

As shown, the system 10 can include a conventional Web crawler 12 that accesses the World Wide Web 14 to construct a data repository 16. Thus, in one intended embodiment the data repository 16 holds Web pages, although it is to be understood that the repository 16 can generally hold a corpus of electronically-stored documents. Furthermore, it is to be understood that the character set need not be the English alphabet, but can be any collection of symbols. For example, the set {A, C, T, G, U} can encode the base elements that make up DNA and RNA in the genome of living organisms.

An index engine 18 accesses the repository 16 to build one or more indices 20 in accordance with disclosure below. The indices 20 are used by a run time matching engine 22 to respond to a regex query from a user computer 24, the query typically having been input by means of an input device 26. The query response is sent to the user computer 24 for output on an output device 28, In one intended embodiment, the computer 24 may be a personal computer made by International Business Machines Corporation (IBM) of Armonk, N.Y., including a 450 MHz Intel Pentium® processor with 256 megabytes of memory running Red Hat 6.2 operating system. Or, the computer 24 may be any computer, including computers sold under trademarks such as AS400, with accompanying IBM Network Stations. Or, the computer 24 may be a Unix computer, or OS/2 server, or Windows NT server, or IBM RS/6000 250 workstation or an IBM laptop computer. The input device 26 can be a mouse or keyboard or voice recognition device or other input device, and the output device 28 can be a printer or monitor or other computer or computer network that is conventionally coupled to the computer 24.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by a processor as a series of computer-executable instructions. These instructions may reside, for example, in RAM or on a hard drive or optical drive of the system 10, or the instructions may be stored on a DASD array, magnetic tape, electronic read-only memory, or other appropriate data storage device. In an illustrative embodiment of the invention, the computer-executable instructions may be lines of compiled C++ compatible code.

Figures 2, 3:
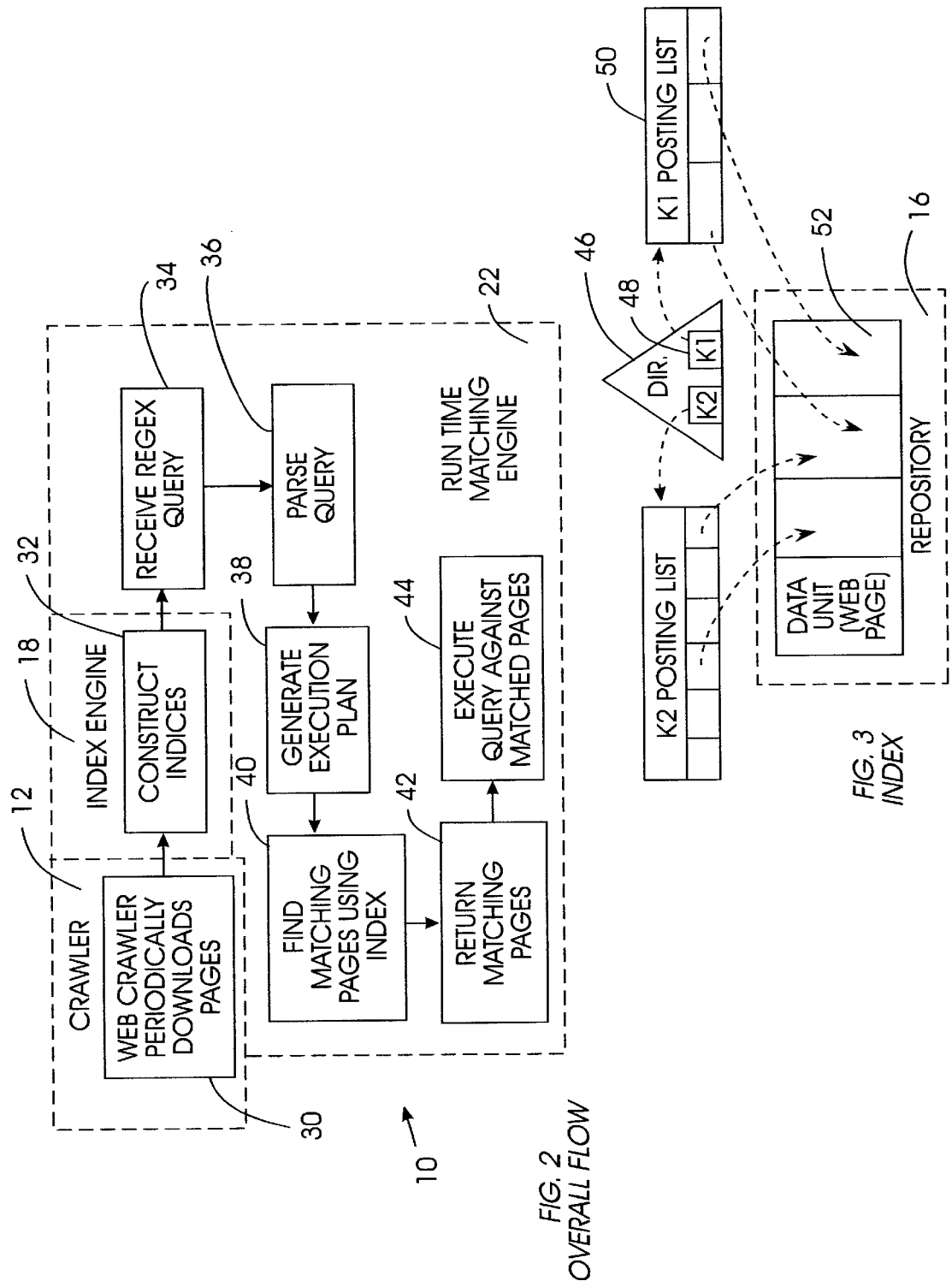
FIG. 2 is a flow chart of the overall logic.
FIG. 3 is a schematic representation of the data structure of an index.

Now referring to FIG. 2, the overall logic of the present invention can be seen. Commencing at block 30, the Web crawler 12 periodically downloads Web pages to the data repository 16. Moving to block 32, the indices of the present invention are constructed by the index engine 18 in accordance with disclosure below. A regex query may then be received at block 34 from the user computer 24, and the query parsed by the run time matching engine 22 at block 36 in accordance with, e.g., relational database system (RDBMS) query parsing principles known in the art and normalized into standard form. The run time matching engine 22 then generates an execution plan at block 38 as discussed further below. The indices 20 are used at block 40 by the matching engine 22 to identify pages or other documents from the repository 16 that satisfy the query. These pages are returned at block 42, and the full regex query is quickly and efficiently executed only against the matching pages at 44, such that a regex query result can then be returned to the user computer 24.

FIG. 3 illustrates a schematic data structure of an index of the present invention. As shown, a directory 46 includes plural "keys" 48, with each key being associated with a respective posting list 50. As set forth further below, the keys 48 can be multigrams. The posting lists 50 contain pointers associating the respective key 48 with documents (e.g., Web pages) 52 in the repository 16 that hold the key. The present invention envisions other ways (e.g., a hash table) of performing the key-posting and mapping set forth herein.

Figure 4:
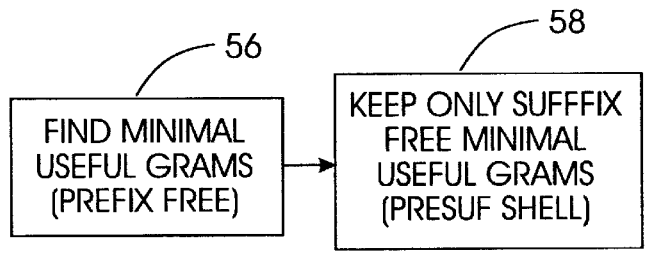
FIG. 4 is a flow chart of the logic for constructing a multigram index.
Figure 5:
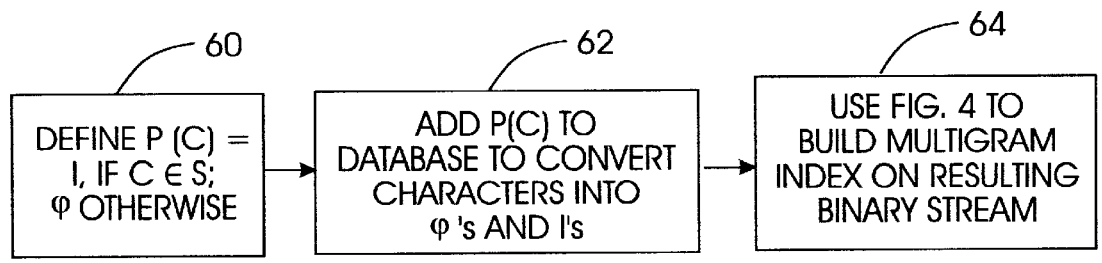
FIG. 5 is a flow chart of the logic for constructing a predicate index.

With the above data structure of an index in mind, reference is now made to FIG. 4, which shows how the index shown in FIG. 3 can be constructed. To understand FIG. 4, it first is to be understood that a "multigram" in the repository 16 is any k-gram that is itself a string $x=x_1x_2x_3 \ldots x_k$ of length k, where each $x_i$ is a character. If there are N data units (e.g., Web pages, or paragraphs, or pages in a corpus of documents) in the repository 16 and M of these data units contain a particular multigram "x", then the "selectivity" of the multigram "x" is M/N, and the multigram "x" is defined to be "c-useful" if its selectivity is less than a user-defined threshold c, $0 \leq c \leq 1$. For brevity of disclosure a multigram can be referred to simply as "useful", it being understood that the term "useful" is relative to a user-defined threshold c.

In accordance with present principles, the user-defined threshold c is selected to balance system performance parameters, and in particular processor speed and I/O performance. For instance, if random access to data units on disk is ten times slower than sequential access, then a value of 0.1 might be selected for the threshold c. In any case, the value of the threshold c depends on the file system being used, the number of arms available for simultaneous use, the size of cache on SCSI controllers, average system load, and so on. Thus, the threshold c is a tunable parameter that is adjusted to tune system performance.

Furthermore, the present invention recognizes that if a multigram is useful, then any extension of the multigram is also useful. For instance, if the hypothetical multigram "IBM PC" is useful, then "IBM PC i", IBM PC is great", and so on are also useful. In this example, the minimal useful multigram would be "IBM PC", since it is the shortest. More generally, when collecting a set of minimal useful multigrams, no multigram in the set is a prefix of any other multigram in the set, to avoid having to index all of the useful multigrams.

Accordingly, with the above definitions in mind, commencing at block 56 in FIG. 4 minimal useful multigrams, preferably prefix-free, are found in accordance with the above definitions. It should be understood that in less preferred embodiments non-useful multigrams can also be kept. One non-limiting algorithm in high-level pseudocode that can be used to construct the set of minimal useful multigrams at block 56 is as follows:

```
Input:     repository 16
Output:    multigram index
Procedure:
[1]   k = 1, expand = {`} // `is a zero-length string
[2]   While (expand is not empty)
[21]       k-grams:= all k-grams in repository whose (k-1)-prefix ∈ expand
[22]       expand:={}
[23]       For each multigram x in k-grams
[231]          If sel(x)≤ Then // check selectivity
[2311]             insert(x, index) // the multigram is useful
[232]          Else
[2321]             expand:=expand ∪ {x}
[3] k:=k+1
```

If desired the index building process can be speeded up by using random sampling of multigrams from the repository 16.

The exemplary non-limiting algorithm above finds maximal useless grams and extends all useless grams of length k to grams of length k+1, and then it evaluates which of the new set of grams are useless. The useless grams are expanded further, whereas the useful grams are minimal useful grams and are maintained in the output index, since their prefixes are all useless.

The present invention has made the recognition that any multigram that can be derived by adding something to the front of a useful multigram would (wrongly) qualify as useful as well. For instance, a multigram index might contain <a href="k, a href="k, href="k, . . . ="k, with the grams <a href="k, a href="k, href="k, . . . up to the last gram="k not being useful since <a href=" is a very common string on the Web and consequently does not have any discriminating power. The discriminating power comes from the last character k. Accordingly, at block 58 of FIG. 4, if desired in one preferred, non-limiting embodiment, only suffix-free minimal useful multigrams can be kept in the index. That is, a subset Y of a prefix free minimal useful multigram set X is also suffix free if 1. for every $x \in X$, either $x \in Y$, or $\exists y \in Y$ such that y is a suffix of x.
2. Y is suffix free.

Figure 6:
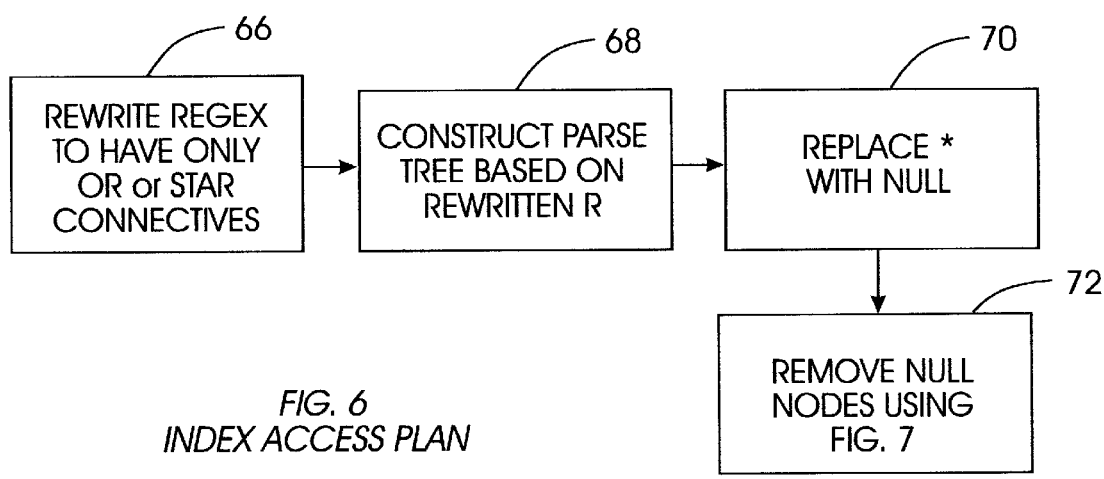
FIG. 6 is a flow chart of the logic of a plan for accessing an index.

The present invention provides a second type of multigram index referred to herein as a "predicate index". FIG. 6 illustrates how to generate a predicate index. Essentially, a predicate index is an index of numeric multigrams. Consider the regex (\d\d\d)\d\d\d-\d\d\d\d, which describes a common way of writing US phone numbers. Predicate indices are useful in handling such regexs. Commencing at block 60 and considering the specific case where the set $S=\{0, 1, \ldots, 9\}$, a predicate P(c) is defined to be 1 if $c \in S$, and 0 otherwise. Moving to block 62, the predicate is applied to the repository to convert the stream of characters therein into 0s and 1s, and then at block 64 the algorithm above is used to build a multigram index from this binary stream.

Having set forth the logic of the index engine 18 in constructing indices, reference is now made to the remaining figures, which show the logic of the run time engine 22. When a regex query is received, at block 66 of FIG. 6 the query is rewritten to have only OR (|) or star (*) connectives. For example, the regex [0-9] can be rewritten as 0 | 1 | . . . | 9, and C+ is equivalent to CC*. Or consider the regex query (Bill | William).*Clinton, which corresponds to the Boolean (Bill OR William) AND Clinton and which can be rewritten as (Bill | William) (a | b | c)*Clinton (it being understood that for simplicity the dot has been rewritten simply as a, b, and c instead of as the entire alphabet of characters). The problem recognized and addressed by the present invention is that not all the grams in the regex may be present in the index. Thus, the access plan must account for gram availability in the index.

Figures 7, 8:
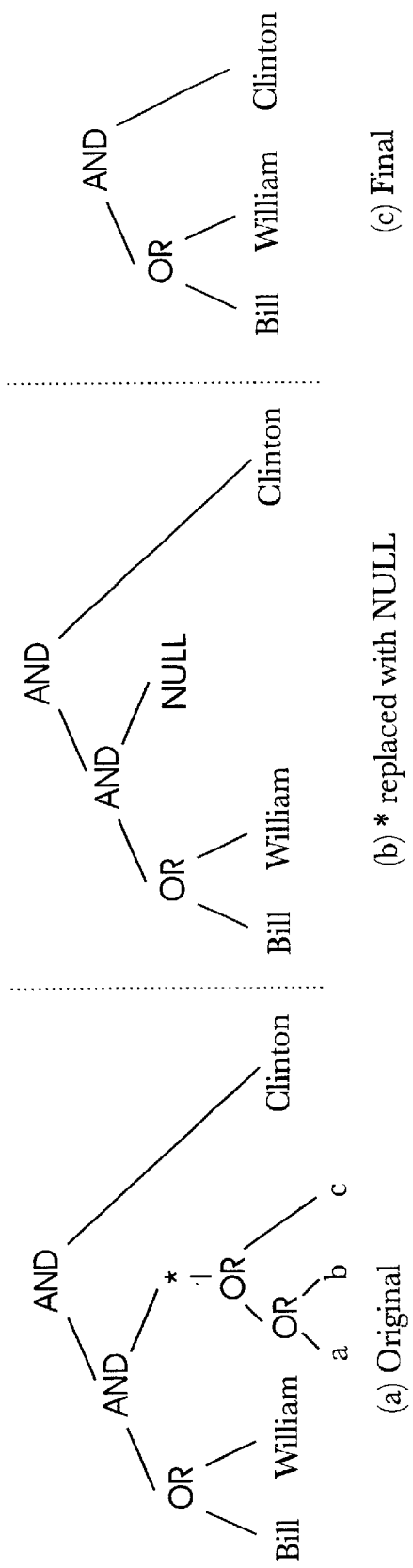
FIG. 7 is a schematic representation of an AND node and an OR node.
FIG. 8 is a schematic representation showing operations on a tree of the nodes shown in FIG. 7.

Accordingly, from block 66 the logic proceeds to block 68 to construct a parse tree based on the rewritten query. An example of such a tree is shown in FIG. 8, example (a). In the parse tree, the leaf nodes correspond to the substrings/ characters within the rewritten query and the internal nodes correspond to the Boolean connectives.

From this parse tree strings that can be looked up in the index are identified. Specifically, when a string includes the star connective *, the string may or may not appear in the index, so the string cannot be used for look up. Accordingly, every star connective is replaced with NULL at block 70, as shown in FIG. 8, example (b). Essentially, NULL means that no index entry can be looked up to process that part of the parse tree.

As understood herein, a NULL corresponds to a Boolean value of TRUE, since it can be satisfied by every data unit in the repository. Accordingly, when a NULL node is the child of an AND connective, the logical AND is resolved in accordance with the other child. If the NULL node is a child of an OR connective, then the sub-formula subtended at the connective is changed to NULL. In any case, the parse tree can be simplified at block 72 by eliminating NULL nodes in accordance with the above-mentioned logical operations, which are shown in tabular form in FIG. 7. The result is shown at example (c) in FIG. 8.

The logic next determines, given the index access plan output by FIG. 6 (e.g., example (c) in FIG. 8), what entries are available and how they should be accessed. Entries can be unavailable for two reasons: either the corresponding multigram is useless, or it was useful but was not a minimal useful gram or was pruned away at block 58 in FIG. 4 for maintaining an index of suffix-free multigrams. In the first case, no substring of the multigram will be in the index, whereas in the second case at least one substring will be in the index.

Accordingly, referring to the illustration provided in FIG. 9 and commencing at decision diamond 74 in FIG. 10, the logic determines whether a substring of a multigram in the index access plan is present in the index, and if not, the corresponding node in the parse tree is replaced by a NULL at block 76. If at least one substring is in the index, however, the corresponding node in the parse tree is replaced by an AND of all the available indexed substrings at block 78. The NULL nodes are processed as discussed above in relation to FIGS. 6 and 7.

In the example shown in FIG. 9, it is assumed that only the multigrams "Willi", "liam", "Clint", and "nton" are present in the index. Accordingly, as shown at example (a) in FIG. 9 and in accordance with the logic discussed above for FIG. 10, "Bill" is replaced by a NULL, "William" is replaced by an AND of its substrings appearing in the index, and "Clinton" is likewise replaced by an AND of its substrings appearing in the index. At block 80 the plan is simplified using Boolean logic. For instance, if the plan consists of a complex combination of AND and OR nodes, redundant nodes may be removed. In the example shown in FIG. 9, since a NULL node depends from an OR node, the entire OR branch with leaves of "Willi" AND "liam" is eliminated, leaving the simplified access plan of example (b) in FIG. 9. Also, the tree can be reorganized by pushing AND connectives over rare multigrams toward the leaves of the tree.

Having disclosed the preferred ways to construct an index and then access the index to execute a query during run time to return matching pages to the regex query, attention is now drawn to FIG. 11, which shows a non-limiting optimization to speed up the matching of the regex query to occurrences in the matching pages. Commencing at block 82, substrings of the regex query are identified and designated as "anchors". The anchor is searched for in the matching page being checked at block 84 by using, e.g., a Boyer-Moore algorithm for efficient search. Then, a full regex query match is performed at block 86 only in the vicinity of "anchors".

While the particular SYSTEM AND METHOD FOR REGULAR EXPRESSION MATCHING USING INDEX as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A computer system, comprising:
   a general purpose computer system accessing at least one data repository, the system comprising:
   at least one regular expression (regex) index generator generating at least one multigram index; and
   at least one run time engine receiving a regex query and accessing the index to respond to the query, the run time engine returning data from the repository in response to the query, wherein the index contains only minimal useful multigrams.

2. The system of claim 1, further comprising a Web crawler associated with the data repository, the data repository including Web pages.

3. The system of claim 1, wherein the run time engine includes logic for:
   parsing the regex query;
   generating an execution plan based on a parsed query;
   using the execution plan, finding matching documents in the repository using the index; and
   executing the query against at least portions of the matching pages.

4. The system of claim 1, wherein the index contains only minimal useful multigrams relative to a user-defined usefulness factor "c".

5. The system of claim 4, wherein the index contains only suffix-free minimal useful multigrams.

6. The system of claim 1, wherein the index is a predicate index including multigrams representing binary numbers.

7. A computer system, comprising:
   a general purpose computer system accessing at least one data repository, the system comprising:
   at least one regular expression (regex) index generator generating at least one multigrain index; and
   at least one run time engine receiving a regex query and accessing the index to respond to the query, the run rime engine returning data from the repository in response to the query, wherein the index includes plural keys, each key having an associated posting list representing documents in the repository containing the key.

8. The system of claim 7, wherein the keys are multigrams.

9. A computer system, comprising:
   a general purpose computer system accessing at least one data repository, the system comprising:
   at least one regular expression (regex) index generator generating at least one multigram index; and
   at least one run time engine receiving a regex query and accessing the index to respond to the query, the run time engine returning data from the repository in response to the query, wherein the index contains only minimal useful multigrams, wherein the run time engine generates an execution plan based on a parsed query at least partially by rewriting a query to have only "OR" or "STAR" logical connectives.

10. The system of claim 9, wherein the run dine engine constructs a parse tree and replaces STAR nodes in the tree with NULL, and then removes NULL nodes.

11. The system of claim 10, wherein each term remaining in the tree after NULL nodes have been removed is replaced by an AND of all multigrams contained in the term.

12. The system of claim 11, wherein multigrams not occurring in the index are replaced by one of: NULL, or a minimum useful multigram in the index.

13. The system of claim 12, wherein the plan is simplified using Boolean logic.

14. A computer system, comprising:
a general purpose computer system accessing at least one data repository, the system comprising:
at least one regular expression (regex) index generator generating at least one multigram index; and
at least one run time engine receiving a regex query and accessing the index to respond to the query, the run dine engine returning data from the repository in response to the query, wherein the run time engine executes the query by performing a full regex match only in a predetermined vicinity of an anchor in a document.

15. A computer program device comprising:
a computer program storage device readable by a digital processing apparatus; and
a program on the program storage device and including instructions executable by the digital processing apparatus for executing a regex query, die program comprising:
computer readable code means for generating at least one index; and
computer readable code means for accessing the index to execute a regex query, wherein the means for accessing generates an execution plan based on a parsed query at least partially by rewriting a query to have only "OR" or "STAR" logical connectives.

16. The computer program device of claim 15, wherein the index is a multigram index.

17. The computer program device of claim 16, wherein the means for accessing executes the query against the World Wide Web.

18. The computer program device of claim 16, wherein die means for accessing executes the query against a data repository.

19. The computer program device of claim 18, wherein the means for accessing includes:
means for parsing the regex query;
means for generating an execution plan based on a parsed query;
means for, using the execution plan, finding marching documents in the repository using the index; and
means for executing the query against at least portions of the matching pages.

20. The computer program device of claim 18, wherein the index includes plural keys, each key having an associated posting list representing documents in the repository containing the key.

21. The computer program device of claim 20, wherein the keys are multigrams.

22. The computer program device of claim 18, wherein the means for accessing executes the query by performing a full regex march only in a predetermined vicinity of an anchor in a document.

23. The computer program device of claim 15, wherein the index is a predicate index including multigrams representing binary numbers.

24. The computer program device of claim 15, wherein the means for accessing constructs a parse tree and replaces STAR nodes in the tree with NULL, and then removes NULL nodes.

25. A computer program device comprising:
a computer program storage device readable by a digital processing apparatus; and
a program on the program storage device and including instructions executable by the digital processing apparatus for executing a regex query, the program comprising:
computer readable code means for generating at least one index; and
computer readable code means for accessing the index to execute a regex every, wherein the index contains only minimal useful multigrams relative to a user-defined usefulness factor "c".

26. The computer program device of claim 25, wherein the index contains only suffix-free minimal useful multigrams.

27. A computer-implemented method for executing a regular expression (regex) query against a data repository, comprising:
generating at least one multigrain index;
receiving a regex query;
accessing the index based on the query;
returning a set of Web pages based on the accessing act; and
searching the set of Web pages for matches to die regex query.

28. The method of claim 27, further comprising:
parsing the regex query;
generating an execution plan based on a parsed query;
using the execution plan, finding matching documents using the index; and
executing the query against at least portions of the matching pages.

29. The method of claim 28, comprising executing we query by performing a full regex match only in a predetermined vicinity of an anchor in a document.

30. The method of claim 27, wherein the index includes plural keys, each key having an associated posting list representing Web pages containing the key.

31. The method of claim 27, wherein the index is a predicate index including multigrams representing binary numbers.

32. A computer-implemented method for executing a regular expression (regex) query against a data repository, comprising:
generating at least one multigram index;
receiving a regex query;
accessing the index based on the query;
returning a set of Web pages based on the accessing act; and
searching the set of Web panes for matches to the regex query wherein the index contains only minimal useful multigrams relative to a user-defined usefulness factor "c".

33. A computer-implemented method for executing a regular expression (regex) query against a data repository, comprising:

generating at least one multigram index;

receiving a regex query;

accessing the index based on the query;

returning a set of Web pages based on the accessing act; and searching the set of Web panes for matches to the regex query, wherein the index contains only suffix-free minimal useful multigrams.

34. A computer-implemented method for executing a regular expression (regex) query against a data repository, comprising:

generating at least one multigram index;

receiving a regex query;

accessing the index based on the query;

returning a set of Web pages based on the accessing act; and searching the set of Web pages for matches to the regex query, and further comprising generating an execution plan based on a parsed query at least partially by rewriting a query to have only "OR" or "STAR" logical connectives.

35. The method of claim 34, comprising:

constructing a parse tree;

replacing STAR nodes in the tree with NULL; and removing NULL nodes.

* * * * *